July 2, 1957   J. E. FRITSCHE   2,797,828
MOVABLE AND ADJUSTABLE FLOOR FOR LOADING A VEHICLE
Filed Oct. 28, 1954   2 Sheets-Sheet 1
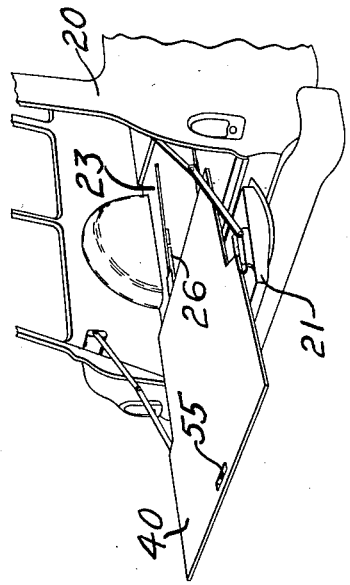
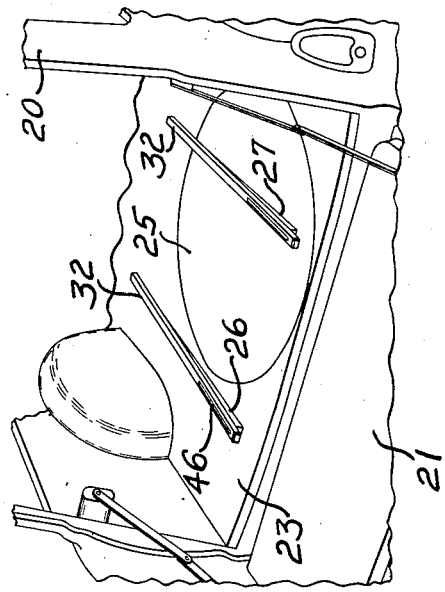
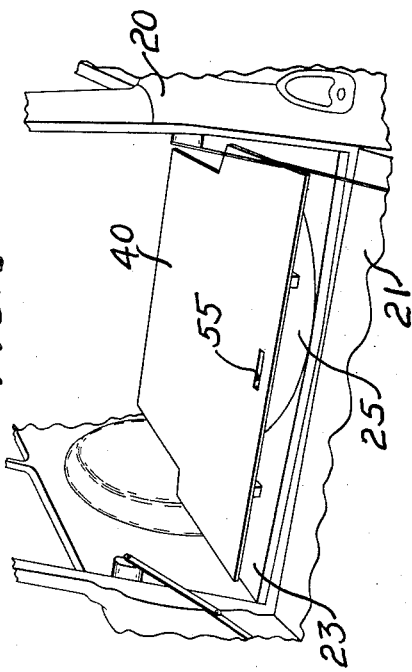
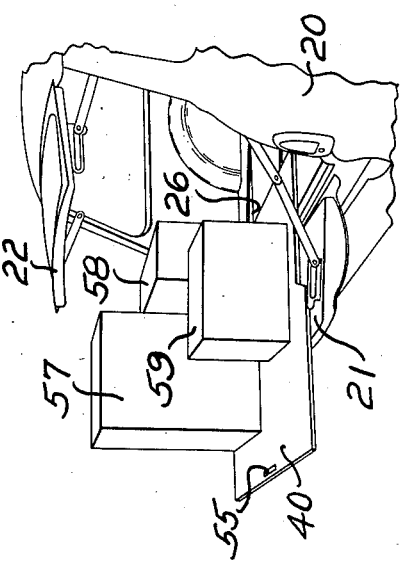
Inventor
James E. Fritsche
By Ayres D. Stoddard
Attorney July 2, 1957 J. E. FRITSCHE 2,797,828
MOVABLE AND ADJUSTABLE FLOOR FOR LOADING A VEHICLE
Filed Oct. 28, 1954 2 Sheets-Sheet 2
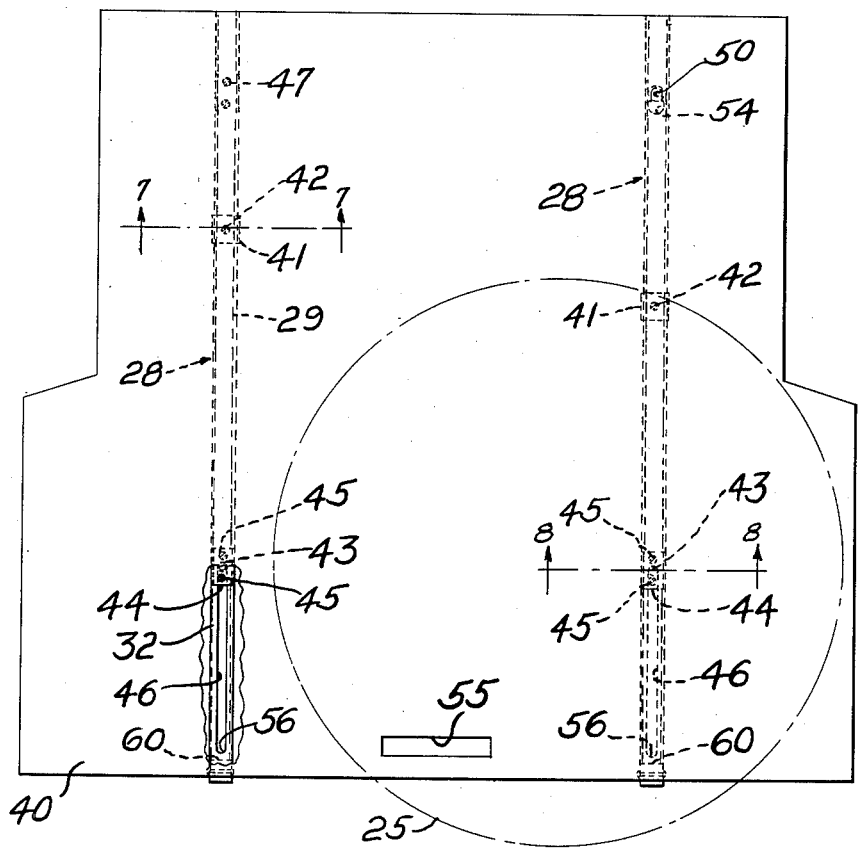
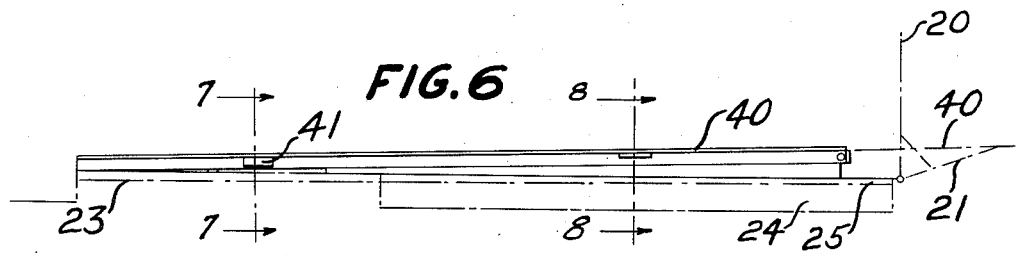
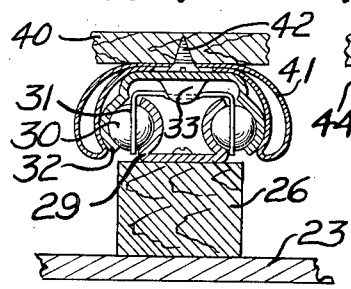
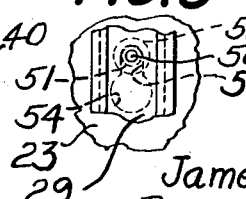
Inventor
James E. Fritsche
By Ayres D. Stoddard
Attorney

# United States Patent Office 2,797,828
Patented July 2, 1957

2,797,828

MOVABLE AND ADJUSTABLE FLOOR FOR LOADING A VEHICLE

James E. Fritsche, Fairborn, Ohio

Application October 28, 1954, Serial No. 465,302

3 Claims. (Cl. 214—83.24)

My invention relates to movable and adjustable floors for vehicles of the type having rear openings for the reception of boxes, packages or articles of merchandise, the type of vehicle being more particularly known as the so called station wagons or ranch wagons.

These latter types usually have an entrance in the rear which is closed by an upper hinged door and a lower hinged tail gate, both of which may be moved into a substantially horizontal position.

In certain of such types of vehicles, the rear seat is removable or can be folded forward in order to provide an area inside the vehicle for the reception of boxes, packages, luggage and other articles.

When loading such boxes, packages or other articles in the vehicle it is necessary to set the box or article on the lowered tail gate, especially when the box or article is a heavy one, then climb inside the vehicle, and when inside, move the boxes or packages forward on to the stationary floor so that several boxes and/or packages may be loaded and also so that the tail gate can be closed after such loading.

When the person loading boxes, packages, etc. has climbed into the vehicle, as above mentioned, he is usually either in a crouched position, or in a kneeling position, or he may even be in a sitting position, and when in any of said positions it is very difficult and laborious to move heavy boxes or packages from the tail gate to the stationary floor.

Many times it becomes necessary to lift these heavy boxes or packages from the tail gate, which is usually a little below the stationary floor level, up to said floor level.

Such shifting and lifting of heavy boxes and packages is not only difficult, tiresome and laborious, but is quite hazardous to the person because of the great danger of becoming ruptured, or receiving serious back or muscle strains, when lifting while in such awkward positions.

Therefore, to eliminate the danger of rupture, back or muscle strain to persons loading the vehicle, and to also make it very easy, and therefore, not tiresome or laborious for them to load heavy boxes or packages into the vehicle, I have invented a simple device to be attached to and movable relative to the stationary floor for such types of vehicles previously mentioned.

Therefore it is an object of my invention to provide a vehicle of the type above mentioned, with an auxiliary floor which is movable from a normal position, wholly inside the vehicle, to a position where a portion of said auxiliary floor extends beyond the edge of the stationary floor of the vehicle, and may be further extended beyond the outer edge of the tail gate when the latter is in its lowered position.

It is another object of my invention to provide guiding tracks upon which the auxiliary or movable floor slides from one position to the other.

A further object is to provide guiding tracks secured to the stationary floor and mounted in positions to be engaged by retaining means on the movable floor to hold said movable floor in alignment with the guiding tracks during the shifting of the movable floor from one position into another.

A still further object of my invention is to provide a special angular mounting for the guiding tracks so that when the auxiliary or movable floor is fully extended beyond the stationary floor, the bottom of said movable floor will be substantially the same height as the rear edge of the opened tail gate, thus the tail gate provides a support for the fully extended auxiliary or movable floor.

Still another object of my invention is to provide guiding tracks which are of the adjustable and extendable type with either roller or ball bearings between the extendable members of the tracks to thus provide a support for the movable floor of such a type that when said floor is either empty or fully loaded with boxes and/or packages, it will roll in and out of the vehicle with the greatest of ease, thus requiring very little effort to move the auxiliary floor from its outer, or loading position, into its position fully inside the vehicle whereby the tail gate can be closed.

And still another object of my invention is to provide the auxiliary movable floor with a plurality of gripping devices adapted to grip said adjustable guiding tracks to hold the auxiliary floor in its proper position relatively to said guiding tracks which are secured to the stationary floor.

With these and incidental objects in view my invention includes certain novel features and novel combinations of constructions of parts, the essential elements of which are set forth in appended claims, and a preferred form of embodiment of which is hereinafter described with reference to the drawings which accompany and form a part of this specification.

In said drawings:

Fig. 1 shows, in perspective, and reduced scale a fragmentary rear part of a vehicle of the station wagon or ranch wagon type, illustrating my auxiliary or movable floor in position fully inside the vehicle.

Fig. 2 is a perspective view of a fragmentary rear part of said type of vehicle showing the auxiliary floor fully extended into "loading" position and illustrates how it is supported by the opened tail gate.

Fig. 3 is a perspective view of a fragmentary rear part of said type of vehicle, showing the auxiliary or movable floor fully extended into its "loading" position, and again illustrates how the lowered tail gate supports the movable floor when it is extended beyond the stationary floor, and this figure also shows three boxes or packages which have been loaded on to my auxiliary or movable floor.

Fig. 4 is another perspective view of a portion of the rear part of the rear loading type of vehicle, and illustrates the adjustable guiding tracks secured to the tapered supporting bars which are fastened to the stationary floor, and this figure also shows the outline of the cover or lid for the spare tire well.

Fig. 5 is an enlarged plan view of my auxiliary or movable floor with the guiding tracks in their respective positions relative to the movable floor.

Fig. 6 is a side elevation of one of the guiding tracks and supporting bar therefor, and shows in dot-and-dash lines the tail gate in lowered position to show how the bottom of the movable floor lines up with the top of the tail gate, when said tail gate is in its lowered position.

Fig. 7 is an enlarged section on line 7—7 of Figs. 5 and 6 looking in the direction of the arrows, and shows fragments of the stationary floor and my movable floor and illustrates how the guiding tracks are secured to the tapered support which is in turn secured to the stationary floor. This Fig. 7 also shows how the gripping clips on the movable floor grips the guiding tracks.

Fig. 8 is an enlarged section on line 8—8 of Figs. 5 and 6 looking in the direction of the arrows and show the channel guide on the movable floor and illustrates how this channel guide slides over the guiding track and also shows the guide stud carried by the channel guide which stud slides in the slot in the top of the guiding tracks.

Fig. 9 is an enlarged detail showing the manner of locking the right hand guiding track to the stationary floor in front of the tire well lid, by means of a key-slot so that when the tire well lid is removed, the guiding track which is secured to this lid, can be released from the stationary floor.

General description

Described in general terms my invention includes a freely slidable, and easily adjustable auxiliary or movable floor for a vehicle of the station wagon, ranch wagon or light delivery automobile trucks which have a rear opening which is closed by a tail gate adapted to be lowered into a substantially horizontal position, and an upper gate adapted to be raised into a substantially horizontal position to provide the necessary access to the floor area for loading purposes.

My auxiliary or movable floor slides on a pair of guiding tracks and is provided with gripping clips which grip the guiding tracks near the front central part of the movable floor to guide the floor so that it will travel in a straight line when it is being adjusted from one position into another position.

There is also provided a pair of channel guides each having a pilot stud to slide in slots in the top of the guiding tracks to further guide the movable floor in a straight line of travel, and also provide means whereby the movable floor may be extended further than the movement of the sliding guiding tracks permit. Therefore the rear portion of the movable floor can be extended a substantial distance beyond the edge of the lowered tail gate when the movable floor is extended its full distance out of the rear of the station wagon or other type of vehicle in which it has been made a part thereof.

Thus when my movable floor has been fully extended out beyond the tail gate, as shown in the drawings in Figs. 2 and 3, it becomes very easy to load heavy boxes or packages on to said movable floor and then move the floor inwardly into its normal position thus carrying all of the heavy boxes or packages which have been loaded on to said movable floor, into the vehicle without any extra effort, since when the movable floor is pushed towards the front or inner part of the vehicle it slides very freely on the ball bearing guiding tracks which I have provided for my movable floor to travel on.

Therefore, it can be clearly seen that the elements of danger of rupture, muscle or back strain is wholly eliminated, and the vehicle can be loaded without laborious toil which was necessary when the person loading the vehicle had to lift the heavy boxes, packages etc. over the tail gate, or put them on the tail gate and then climb into the vehicle and when in a stooped or crouched or kneeling position, again lift the heavy boxes from the tail gate into the vehicle.

Detailed description

For illustrative purposes I have shown my invention in connection with a vehicle of the station wagon or ranch wagon, a fragmentary portion 20 of which is shown in Figs. 1 to 4, and in all four figures a tail gate 21 is shown in its open or lowered position. In Fig. 3 the upper gate 22 is shown in its open or raised position.

The stationary floor 23 of the vehicle is shown in Figs. 1 to 4 and in the particular vehicle illustrated the spare tire is carried in a well 24 (Fig. 6) which is covered by a lid 25 (Figs. 1, 4 and 5).

Mounted on and rigidly secured to the stationary floor 23 is a tapered support bar 26 (Figs. 2, 4 and 7), and mounted on and rigidly secured to the tire well lid 25 is a tapered support bar 27. Rigidly secured to the tapered support bars 26 and 27 are slidable guiding tracks 28. Each guiding track includes an inner channel rail 29 (Fig. 7) which supports a ball bearing comprised of a plurality of balls 30 retained in a slidable ball retainer 31. This inner channel rail 29 is the portion of the guiding track which is secured to the tapered support bars 26 and 27. There are two ball retainers 31 and sets of balls 30 for each guiding track. Sliding on the balls 30 is an outer channel rail 32. Stop lugs 33 only one of which is shown in Fig. 7 are provided to prevent end separation of the inner channel rail 29 and the outer channel rail 32.

My auxiliary or movable floor 40 (Figs. 1 to 3, and 5 to 8) rests on the outer channel rails 32 of the guiding tracks 28. The floor 40 is held in proper position relative to the guiding tracks 28 by two spring gripping clips 41 which are secured to the movable floor 40 by screws 42. These gripping clips 41 grip the outer channel rails 32 normally in the positions shown in Fig. 5, but as will be later explained they slide along the rails 32 as my movable floor is adjusted from one position into any other position.

The movable floor 40 is further guided in its movements in and out of the vehicle, by pilot studs 43 (Figs. 5 and 8) which are secured to channel guides 44, which, in turn, are secured by means of bolts or screws 45 to the movable floor 40. The pilot studs 43 project into and slide in slots 46 of the outer channel rail 32 and thus guide the movable floor in its movements.

The forward end of the left hand inner channel rail 29 is secured to the stationary floor 23 by bolts or screws 47 (Fig. 5).

Due to the fact that the right hand track 28 is secured to the tire well lid 25, the front end of the inner channel rail 29 of this track cannot be bolted or screwed to the stationary floor 23, because this right hand track 28 must come up with the tire well lid 25 whenever it is necessary to get the spare tire out of the car.

Therefore, this right hand rail 29 has secured thereto a stud 50 (Figs. 5 and 9) with a shoulder 51 and a large head 52. The stationary floor 23 has a key-slot comprised of a slot 53 slightly larger than the diameter of the stud shoulder 51 and into which said shoulder 51 normally rests when the lid 25 is in place over the tire well 24.

When the tire well lid 25 is removed the person may grasp the guiding track 28 and raise the lid 25 slightly, the shoulder 51 being of sufficient length to permit such raising of the lid 25, and after such raising of the lid 25 the lid is moved towards the rear of the vehicle until the head 52 of the stud 50 registers with an enlarged opening 54 which is connected to the slot 53. Now with the head 52 in register with the opening 54 the well lid 25 may be completely removed from the floor 23.

However before removing the tire well lid 25 in the manner above explained it is necessary to remove the movable floor, and to do this it is necessary only to raise the rear edge of the movable floor 40 until the pilot studs 43 are removed from the slots 46 from the guiding tracks 28. Continued raising of the floor 40 causes the gripping clips 41 to be removed from the tracks 28 whereupon the entire movable floor 40 can be removed wholly from the vehicle so that it will not in any way hinder the removal of the tire.

To replace the tire well lid 25, just reverse the proceeding used to remove said lid, that is, put the head 52 of the stud 50 into the large opening 54 and then push the lid 25 forward until the shoulder 51 of the stud 52 enters the narrow slot 53, at which time the lid 25 will register with the tire well and then the person has only to let the lid 25 then rest into its proper place over the well 24. With the shoulder 51 in the slot 53, the large head 52 locks the well lid 25 in place and at the same time locks the right hand guiding track 28 in its proper position relative to the left hand guiding track 28.

To now replace the movable floor 40 back on the guiding tracks 28 it is necessary only to place the gripping clips 41 over the tracks 28 and guide the pilot studs 43 into the slots 46 in the tracks 28 and let the floor 40 rest itself on said guiding tracks 28.

A hand hole 55 is provided to make it easy for the operator of the vehicle to move the floor 40 outward for easy loading purposes.

My invention operates as follows. As the floor 40 is drawn rearwardly or out of the vehicle the outer channel rail 32, due to the ball bearings 30—31, slides freely until the end of the ball retainer 31 strikes the stop 33. At the beginning of this outward movement of the floor 40, the pilot studs 43 are in the positions shown in Fig. 5, that is they are in the front parts of the slots 46 of the rails 32.

When the end of the ball retainer 31 strikes the stop 33, a continued outward pull of the floor 40 causes the pilot studs 43 to travel in the slots 46 until said studs 43 are in the rear parts of the slots 46 at points marked 56, and then the movable floor 40 is in the position shown in Figs. 2 and 3 wherein the rear end of the movable floor 40 extends beyond the lowered tail gate 21. In this position the tail gate 21 supports the rear portion of the floor 40 as shown diagrammatically in Fig. 5 by the dot-and-dash lines.

Now with the movable floor 40 fully extended it becomes very easy for the person to load heavy boxes or packages, shown at 57, 58 and 59 in Fig. 3 on to the extended floor 40. When so loaded the floor 40 is easily pushed inwardly into its normal inner position and during the first part of this return movement of the floor 40 the pilot studs 43 travel in the slots 46 until they, said studs, reach the forward ends of said slots 46, and during this movement, the gripping clips 41 slide back along the rails 32.

After the studs reach the forward ends of the slots 46 the rail 32 rides on the ball bearings 30—31 and slides rearwardly to normal position shown in Fig. 5, wherein a rubber buffer 60 secured in the end of the outer rail 32, strikes the end of the inner rail 29. This buffer 60 reduces the noise and shock of sudden stopping of a fast moving floor when the latter is pushed very hard and fast.

While the form of my invention herein described is admirably adapted to fulfill the objects primarily stated, it is to be understood that I do not wish to limit my invention to the exact form shown and described as it is susceptible of other forms without departing from the true spirit of my invention.

What I claim as new is:

1. A vehicle having a stationary floor and a rear opening and a hinged closure for the lower part of said opening, said hinged closure adapted to be lowered from a closed or vertical position into an open or substantially horizontal position; a movable floor carried by the stationary floor and normally supported entirely above said stationary floor but adapted to be adjusted into positions where a portion of the movable floor extends beyond the edge of the stationary floor; tapered devices to form said movable floor support in all positions of said movable floor, and being so proportioned as to cause the movable floor to contact the outer edge of the lowered hinged closure when said closure is in its substantially horizontal position when said movable floor is fully extended; means carried by the stationary floor and adapted to cooperate with the movable floor in its said normal position and in said positions where a portion of the movable floor extends beyond the edge of the stationary floor; and devices carried by said movable floor and cooperating with said means to further extend said movable floor whereby a portion of the same rests upon said hinged closure when the latter is in its lowered position.

2. A vehicle having a stationary floor and a rear opening and a hinged closure for the lower part of said opening said hinged closure adapted to be lowered from a closed or vertical position into an open or substantially horizontal position; an adjpstable floor carried by the stationary floor and normally supported entirely above said stationary floor but adapted to be adjusted into positions where a portion of the adjustable floor extends beyond the edge of the stationary floor; a slidable mounting track comprised of two channel rails, one rail being secured to the stationary floor, the other rail supporting said adjustable floor; a second slidable mounting track comprised of two channel rails, one rail having a headed stud to cooperate with a key-slot in the stationary floor to lock said one rail of the second slidable mounting track to the stationary floor, the other rail of the second slidable mounting track supporting said adjustable floor; and a plurality of guiding means carried by said adjustable floor and cooperating with openings in said other rails of both of said slidable mounting tracks to guide said adjustable floor in its movements while it is being adjusted from one position into any of several other of its positions of adjustment.

3. A vehicle having a stationary floor; a movable floor carried by the stationary floor and normally supported entirely above said stationary floor but adapted to be adjusted into positions where a portion of said movable floor extends beyond the edge of said stationary floor; means carried by the stationary floor and adapted to cooperate with the movable floor to support the movable floor in its said normal position and in said positions where a portion of the movable floor extends beyond the edge of the stationary floor; gripping devices comprising spring clips secured to the movable floor in such positions as to engage the first mentioned means to prevent any tilting of the movable floor at any time thus retaining said movable floor in proper position relative to said means; and a plurality of guiding members including a pair of channel members each carrying a pilot stud, said members being carried by said movable floor and cooperating with said first mentioned means to guide and limit the movement of the movable floor.

References Cited in the file of this patent

UNITED STATES PATENTS

| | | |
|---|---|---|
| 860,971 | Gaylord | July 23, 1907 |
| 2,391,310 | Heller | Dec. 18, 1945 |
| 2,576,385 | Bigsby | Nov. 27, 1951 |